(No Model.)
H. U. WILSON.
BRACELET.
No. 462,917. Patented Nov. 10, 1891.
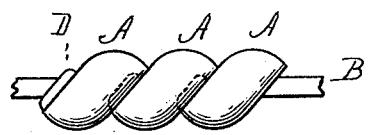
Fig. 1.
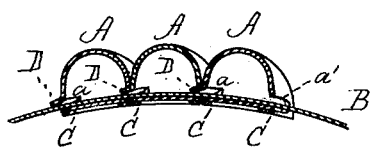
Fig. 2.
 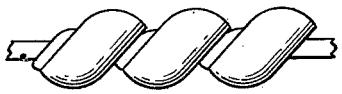 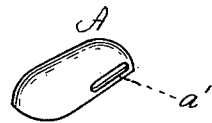
Fig. 3.   Fig. 5.   Fig. 4.
WITNESSES
J. M. Hartnett
B. W. Williams
INVENTOR
Henry U. Wilson,
By his Atty.
Henry W. Williams
THE NORRIS PETERS CO., PHOTO-LITHO., WASHINGTON, D. C.

UNITED STATES PATENT OFFICE.

HENRY U. WILSON, OF WRENTHAM, MASSACHUSETTS, ASSIGNOR TO WADE, DAVIS & CO., OF SAME PLACE.

BRACELET.

SPECIFICATION forming part of Letters Patent No. 462,917, dated November 10, 1891.

Application filed March 2, 1891. Serial No. 383,412. (No model.)

*To all whom it may concern:*

Be it known that I, HENRY U. WILSON, of Wrentham, in the county of Norfolk and State of Massachusetts, have invented a new and useful Improvement in Bracelets, of which the following is a specification.

This invention relates to that class of ornamental bracelets in which the links consist of shells slipped over and strung upon a spring, which supports them and gives shape to the bracelet, and more particularly when such links are not round balls or of cubical shape but of an irregular shape. When the bracelet is composed of links of an irregular shape, the spring on which they are strung is especially liable to show between the links, and it is to prevent this and hide the spring that this improvement is constructed.

In the accompanying drawings, in which similar letters of reference indicate like parts, Figure 1 is a front view of a portion of a bracelet provided with links constructed in accordance with my improvement. Fig. 2 is a horizontal section of the same. Figs. 3 and 4 are perspective views of a link. Fig. 5 is a front view showing a slight modification.

A A are the links made of irregular shells, provided with openings $a$ $a'$, through which the spring B extends.

C C are collets, (not new in this invention,) which lie on the spring within the shells, so that said spring will not show on the inside of the bracelet. These collets are described in Letters Patent No. 427,593, dated May 13, 1890.

D D are lips made integral with the links and extending at about right angles therefrom. Each of these lips D extends from its link into the hole $a'$, Fig. 4, in the link next it, and thus bridges over and hides that part of the spring which is at that point, so that no movements of the bracelet can open the joints sufficiently to expose the spring. The hole $a'$, which is of course on the side of the link opposite to the lip on the same link, may be longer than the hole $a$, which is on the same side as and under the lip, as such hole $a'$ has to receive the lip from the next link. Thus intermediate links for concealing the spring are unnecessary. The lip in addition to covering the spring serves to hold the links firmly together and to the spring and to keep the collets in place. In Fig. 5 the lips do not enter the holes in the next link, but simply bridge the space between the links. The shape of the links or shells may be varied as desired.

The principle of this invention may be applied to links in any style of jewelry, such as necklaces as well as bracelets, pins, &c.

Having thus fully described my invention, what I claim, and desire to secure by Letters Patent, is—

In an article of jewelry comprising links or shells arranged or strung upon a supporting-spring, the link A, provided with the thin projecting covering-lip D, extending from one side of said link to the next link, whereby the portion of the spring between the links is concealed from view, substantially as described.

HENRY U. WILSON.

Witnesses:
WINTHROP F. BARDEN,
LUNAS F. MENDELL